UNITED STATES PATENT OFFICE.

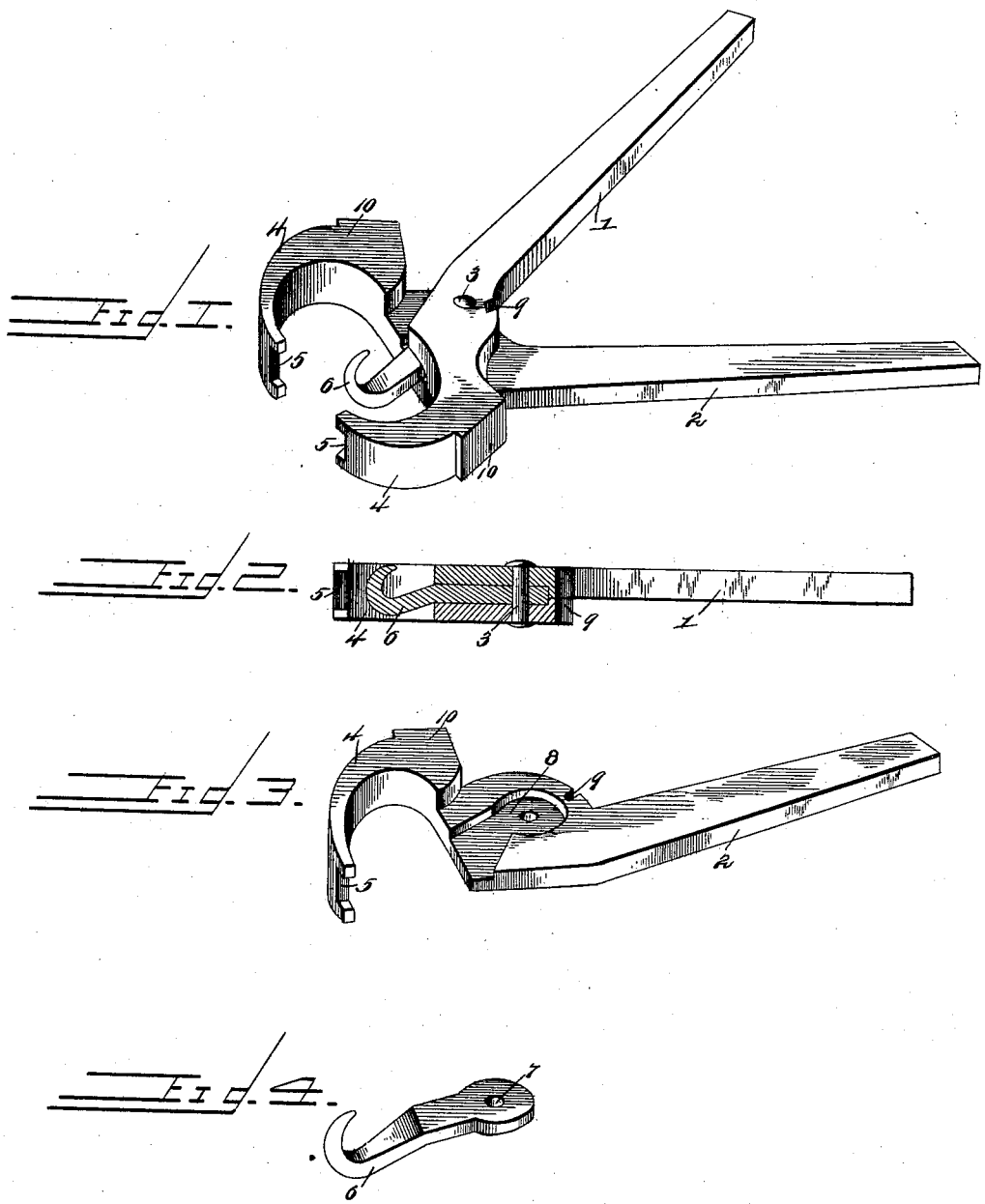

WILLIAM BROWN, OF COMO, TEXAS, ASSIGNOR OF ONE-HALF TO N. T. BATCHELOR, OF SAME PLACE.

WIRE-TIGHTENER.

SPECIFICATION forming part of Letters Patent No. 606,833, dated July 5, 1898.

Application filed March 30, 1898. Serial No. 675,783. (No model.)

*To all whom it may concern:*

Be it known that I, WILLIAM BROWN, a citizen of the United States, residing at Como, in the county of Hopkins and State of Texas, have invented a new and useful Wire-Tightener, of which the following is a specification.

The invention relates to improvements in wire-tighteners.

The object of the present invention is to improve the construction of wire-tighteners and to provide a simple, inexpensive, and efficient device adapted to take up wire between the fence-posts and capable of tightening the same to the desired extent.

A further object of the invention is to provide a device adapted to be used as a pair of pincers and a hammer and capable of forming an effective wire-cutter.

The invention consists in the construction and novel combination and arrangement of parts, as hereinafter fully described, illustrated in the accompanying drawings, and pointed out in the claims hereto appended.

In the drawings, Figure 1 is a perspective view of the wire-tightener constructed in accordance with this invention. Fig. 2 is a sectional view taken longitudinally of the shank of the hook, the jaws being slightly separated to bring the wire-engaging notches into register. Fig. 3 is a detail perspective view of one of the bars or members, showing the inner face thereof. Fig. 4 is a detail perspective view of the hook.

Like numerals of reference designate corresponding parts in the several figures of the drawings.

1 and 2 designate bars or members connected by a pivot 3 and forming a pair of pincers, said bars or members being provided at one end of the device with oppositely-disposed curved jaws 4 and having handle portions at the opposite end of the device. The jaws 4 are provided at their engaging ends with rectangular recesses 5, adapted to receive a wire which is engaged by a hook 6, located in the space between the jaws and having a shank with an eye 7, which is arranged on the pivot 3. The inner faces of the bars or members 1 and 2 are provided with recesses 8 to receive the shank of the hook and the eye 7, which is interposed between the bars or members, as clearly illustrated in Fig. 2 of the accompanying drawings. The recesses 8 of the bars or members 1 and 2 provide a space for the eye and shank of the hook, and the adjacent portions of the faces of the bars or members bear against each other, leaving the shank of the hook free.

In tightening the fence-wire the latter is engaged with one of the jaws and the hook, the device being open to permit such engagement, and the wire-tightener is then swung in the direction of the jaw receiving the wire to bring the other jaw in line with the latter and in engagement with the same. The device is then closed, forming a loop of the wire, which is then twisted in either direction. After the twisting operation has been completed the jaws are opened and the hook may be readily disengaged from the loop. Any number of loops may be taken up or formed in a fence-wire until the latter is tightened to the desired tension, and the loops may be twisted to the desired extent.

The pivoted portions of the jaws or that portion between the jaws and the shanks or handles is provided with wire-receiving recesses 9, disposed at a slight angle and forming cutting edges. In cutting a wire the recesses 9 are brought into register and the wire is placed in them, after which the device is closed, thereby severing the wire.

The device is adapted to be employed as a pair of pincers, and each jaw is provided at its outer face with an enlargement 10, forming a hammer-head.

The invention has the following advantages: The device, which is adapted to be employed as a pair of pincers, a hammer, and a wire-cutter, is simple and comparatively inexpensive in construction, and it is capable of forming an efficient mid-wire take-up and of tightening the wire to the desired extent.

Changes in the form, proportion, and minor details of construction may be resorted to without departing from the spirit or sacrificing any of the advantages of this invention.

What I claim is—

1. A device of the class described comprising a pair of bars or members provided with wire-engaging jaws, a pivot connecting the bars or members to form a pair of pincers, and a hook arranged between the jaws and having its shank interposed between the bars or members and provided with an eye receiving the said pivot, whereby it is secured to the device, substantially as described.

2. A device of the class described comprising a pair of bars or members provided with jaws and having opposite recesses at their inner faces, a pivot passing through the bars or members and located at the inner ends of said recesses, and a wire-engaging hook housed between the jaws and having a shank arranged in the space formed by the said recesses and provided with an eye receiving the said pivot, substantially as described.

In testimony that I claim the foregoing as my own I have hereto affixed my signature in the presence of two witnesses.

WILLIAM BROWN.

Witnesses:
 A. C. ACKER,
 E. E. GAMBLIN.